United States Patent
Morley et al.

(10) Patent No.: US 7,965,775 B2
(45) Date of Patent: Jun. 21, 2011

(54) SELECTIVE CHROMINANCE DECIMATION FOR DIGITAL IMAGES

(75) Inventors: Steven A Morley, San Diego, CA (US); Vijayalakshmi R. Raveendran, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 224 days.

(21) Appl. No.: 12/342,445

(22) Filed: Dec. 23, 2008

(65) Prior Publication Data

US 2009/0103637 A1    Apr. 23, 2009

Related U.S. Application Data

(62) Division of application No. 09/875,329, filed on Jun. 5, 2001, now Pat. No. 7,649,947.

(51) Int. Cl.
*H04N 7/18* (2006.01)
(52) U.S. Cl. .............. 375/240.21; 375/240.26
(58) Field of Classification Search . 375/240.01–240.29
See application file for complete search history.

(56) References Cited

U.S. PATENT DOCUMENTS

| | | | |
|---|---|---|---|
| 4,963,030 | A | 10/1990 | Makur |
| 5,021,891 | A | 6/1991 | Lee |
| 5,107,345 | A | 4/1992 | Lee |
| 5,367,629 | A | 11/1994 | Chu et al. |
| 5,452,104 | A | 9/1995 | Lee |
| 5,781,241 | A | 7/1998 | Donovan |
| 5,903,669 | A | 5/1999 | Hirabayashi |
| 5,973,740 | A | 10/1999 | Hrusecky |
| 6,018,366 | A | 1/2000 | Asai et al. |
| 6,061,098 | A | 5/2000 | Nie et al. |
| 6,064,450 | A | 5/2000 | Canfield et al. |
| 6,184,936 | B1 | 2/2001 | Hu |
| 6,487,249 | B2 | 11/2002 | Kim et al. |
| 6,529,634 | B1 | 3/2003 | Thyagarajan et al. |
| 6,577,352 | B1 | 6/2003 | Park et al. |

FOREIGN PATENT DOCUMENTS

| | | |
|---|---|---|
| CA | 2164372 A1 | 6/1996 |
| EP | 0725363 A2 | 8/1996 |
| EP | 0782342 A2 | 7/1997 |
| EP | 0969669 | 1/2000 |
| EP | 0993198 | 4/2000 |
| JP | 05316364 | 11/1993 |
| JP | 08163596 | 6/1996 |
| JP | 08205140 | 8/1996 |
| JP | 09238366 | 9/1997 |
| JP | 10257492 | 9/1998 |
| JP | 200068854 | 3/2000 |
| JP | 2004533181 | 10/2004 |
| WO | WO9415312 A1 | 7/1994 |
| WO | WO9841024 A1 | 9/1998 |
| WO | WO9918714 A2 | 4/1999 |

(Continued)

OTHER PUBLICATIONS

International Search Report—PCT/US02/17814, International Search Autthority—European Patent Office—Aug. 29, 2002.

(Continued)

*Primary Examiner* — Andy S Rao
(74) *Attorney, Agent, or Firm* — Kevin T. Cheatham

(57) ABSTRACT

A method of decimation of a digital image, the digital image represented by a plurality of pixels, is claimed. In the pixel domain, the digital image is divided into a plurality of blocks. Certain ones of the blocks are selectively decimated based upon predetermined criteria. In an embodiment, the chrominance portions of a given pixel block are decimated.

32 Claims, 5 Drawing Sheets

FOREIGN PATENT DOCUMENTS

WO 0135673 5/2001

OTHER PUBLICATIONS

International Preliminary Examination Report PCT/US02/17814, International Search Autthority—US Office—Feb. 27, 2003.

Yousef, "Image Downsampling and Upsampling Methods," International Conference of Imaging, Science, Systems and Technology, CISST '99, Las Vegas, NV, Jun. 1999, pp. 132-138.

Official Communicated dated Oct. 21, 2009 in European App. No. 06788039.3.

Supplementary European Search Report—EP02734692, Search Authority—Munich Patent Office, Oct. 27, 2009.

|     | m-1 | m  | m+1 | m+2 | m+3 | ... | x |
|-----|-----|----|-----|-----|-----|-----|---|
| n-1 | 20  | 32 | 28  | 24  | 26  |     |   |
| n   | 16  | 22 | 26  | 36  | 32  |     |   |
| n+1 | 24  | 12 | 38  | 40  | 44  |     |   |
| n+2 | 28  | 30 | 36  | 44  | 50  |     |   |
| n+3 | 34  | 32 | 42  | 46  | 52  |     |   |
| ⋮   |     |    |     |     |     |     |   |
| Y   |     |    |     |     |     |     |   |
FIG. 4A (4:4:4)
|     | m-1 | m    | m+1 | m+2  | m+3 | ... | x |
|-----|-----|------|-----|------|-----|-----|---|
| n-1 |     | 28   |     | 25.5 |     |     |   |
| n   |     | 21.5 |     | 32.5 |     |     |   |
| n+1 |     | 21.5 |     | 40.5 |     |     |   |
| n+2 |     | 31   |     | 43.5 |     |     |   |
| n+3 |     | 35   |     | 46.5 |     |     |   |
| ⋮   |     |      |     |      |     |     |   |
| Y   |     |      |     |      |     |     |   |
FIG. 4B (4:2:2)

|       | m-1 | m      | m+1 | m+2   | m+3 | ... | X |
|-------|-----|--------|-----|-------|-----|-----|---|
| n-1   |     |        |     |       |     |     |   |
| n     |     | 23.125 |     | 32.75 |     |     |   |
| n+1   |     |        |     |       |     |     |   |
| n+2   |     | 29.625 |     | 43.5  |     |     |   |
| n+3   |     |        |     |       |     |     |   |
| ⋮     |     |        |     |       |     |     |   |
| Y     |     |        |     |       |     |     |   |

FIG. 4C (4:2:0)

SELECTIVE CHROMINANCE DECIMATION FOR DIGITAL IMAGES

RELATED APPLICATIONS

The present application for patent is a Divisional of patent application Ser. No. 09/875,329 entitled "Selective Chrominance Decimation for Digital Images" filed Jun. 5, 2001, pending and assigned to the assignee hereof and hereby expressly incorporated by reference herein.

BACKGROUND OF THE INVENTION

1. Field of the Invention

The present invention relates to digital signal processing. More specifically, the present invention relates to an apparatus and method for selectively decimating a digital image.

2. Description of the Related Art

Digital picture processing has a prominent position in the general discipline of digital signal processing. The importance of human visual perception has encouraged tremendous interest and advances in the art and science of digital picture processing. In the field of transmission and reception of video signals, such as those used for projecting films or movies, various improvements are being made to image compression techniques. Many of the current and proposed video systems make use of digital encoding techniques. Aspects of this field include image coding, image restoration, and image feature selection. Image coding represents the attempts to transmit pictures of digital communication channels in an efficient manner, making use of as few bits as possible to minimize the band width required, while at the same time, maintaining distortions within certain limits. Image restoration represents efforts to recover the true image of the object. The coded image being transmitted over a communication channel may have been distorted by various factors. Source of degradation may have arisen originally in creating the image from the object. Feature selection refers to the selection of certain attributes of the picture. Such attributes may be required in the recognition, classification, and decision in a wider context.

Digital encoding of video, such as that in digital cinema, is an area which benefits from improved image compression techniques. Digital image compression may be generally classified into two categories: loss-less and lossy methods. A loss-less image is recovered without any loss of information. A lossy method involves an irrecoverable loss of some information, depending upon the compression ratio, the quality of the compression algorithm, and the implementation of the algorithm. Generally, lossy compression approaches are considered to obtain the compression ratios desired for a cost-effective digital cinema approach. To achieve digital cinema quality levels, the compression approach should provide a visually loss-less level of performance. As such, although there is a mathematical loss of information as a result of the compression process, the image distortion caused by this loss should be imperceptible to a viewer under normal viewing conditions.

Existing digital image compression technologies have been developed for other applications, namely for television systems. Such technologies have made design compromises appropriate for the intended application, but do not meet the quality requirements needed for cinema presentation.

Digital cinema compression technology should provide the visual quality that a moviegoer has previously experienced. Ideally, the visual quality of digital cinema should attempt to exceed that of a high-quality release print film. At the same time, the compression technique should have high coding efficiency to be practical. As defined herein, coding efficiency refers to the bit rate needed for the compressed image quality to meet a certain qualitative level. Moreover, the system and coding technique should have built-in flexibility to accommodate different formats and should be cost effective; that is, a small-sized and efficient decoder or encoder process.

One common method employed to reduce the number of bits needed for a compressed digital image is to reduce the spatial resolution of the chrominance information. However, this may cause noticeable image distortion. Alternatively, a common method to remove image distortion is to increase the bit rate of the compressed image. This too is not desirable, as often the available bit rate is limited. Accordingly, a method and apparatus to decimate a digital image but maintain the quality level of the digital image is needed.

SUMMARY OF THE INVENTION

The invention provides for selectively decimating a digital image. Specifically, the digital image is divided into a plurality of blocks. Certain ones of the blocks are selectively decimated based upon predetermined criteria. Aspects of embodiments allow for decimating the chrominance resolution in areas with low amounts of chrominance information to reduce the bit rate, while maintaining chrominance quality that is imperceptible to the human eye. In an embodiment, adaptive block size discrete cosine transform (ABSDCT) techniques are utilized to determine whether to reduce the chrominance resolution in a given pixel area. Areas of high chrominance information are not reduced in resolution, while areas of low chrominance information are reduced in resolution without degrading the overall quality. Decisions may be made on a block by block level, either in the pixel domain or in the frequency domain, as opposed to the entire frame or frames of digital information.

Accordingly aspects of embodiments provide for converting a 4:4:4 digital image to a 4:2:2 digital image or a 4:2:0. An apparatus and method of decimating a digital image where the digital image is represented by a plurality of pixels is described. The size of the pixel blocks is a function of the chrominance resolution of the block. Certain ones of the blocks are then selectively decimated.

Accordingly, it is an aspect of an embodiment to provide an apparatus and method to decimate a digital image based on chrominance resolution while maintaining over all chrominance quality.

It is another aspect of an embodiment to provide an apparatus and method to reduce the bit rate in areas of low chrominance resolution.

It is another aspect of an embodiment to sustain a higher bit rate while maintaining the same quality level.

It is another aspect of an embodiment to achieve a higher image quality level than standard decimation.

BRIEF DESCRIPTION OF THE DRAWINGS

The aspects, features, objects and advantages of the invention will become more apparent from the details of the description set forth below when taken in conjunction with the drawings in which like reference characters identify correspondingly throughout and wherein:

FIG. 4a illustrates an example of a 4:4:4 block of a chrominance portion of pixel data;

FIG. 4b illustrates an example of a 4:2:2 block of a chrominance portion of pixel data; and FIG. 4c illustrates an example of a 4:2:0 block of a chrominance portion of pixel data.

DETAILED DESCRIPTION OF THE PREFERRED EMBODIMENTS

Figure 1:
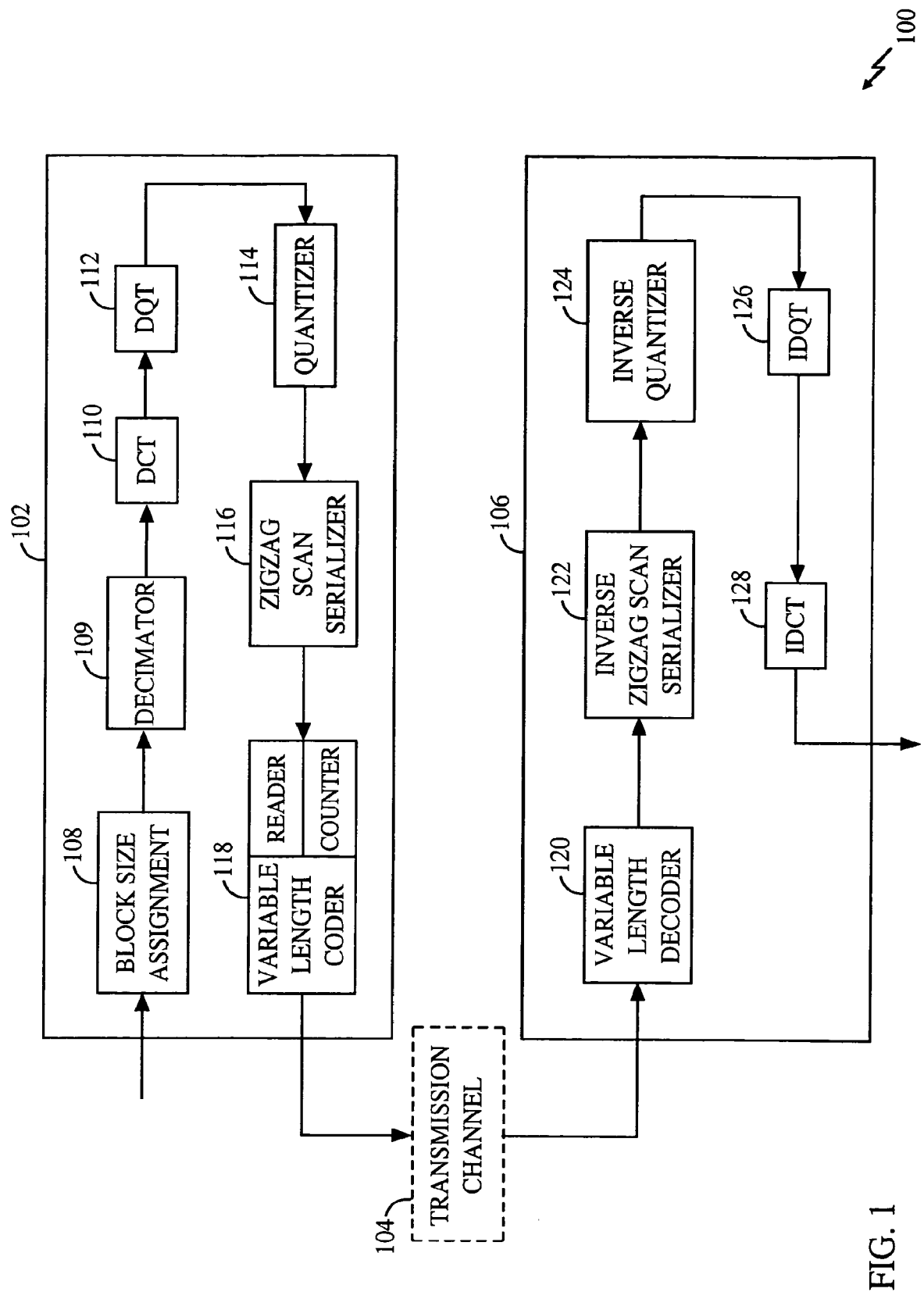
FIG. 1 a block diagram of an image processing system that incorporates a decimator.

In order to facilitate digital transmission of digital signals and enjoy the corresponding benefits, it is generally necessary to employ some form of signal compression. To achieve high definition in a resulting image, it is also important that the high quality of the image be maintained. Furthermore, computational efficiency is desired for compact hardware implementation, which is important in many applications.

In an embodiment, image compression of the invention is based on discrete cosine transform (DCT) techniques. Generally, an image to be processed in the digital domain would be composed of pixel data divided into an array of non-overlapping blocks, N×N in size. A two-dimensional DCT may be performed on each block. The two-dimensional DCT is defined by the following relationship:

$$X(k, l) = \frac{\alpha(k)\beta(l)}{N} \sum_{m=0}^{N-1} \sum_{n=0}^{N-1} x(m, n) \cos\left[\frac{(2m+1)\pi k}{2N}\right] \cos\left[\frac{(2n+1)\pi l}{2N}\right],$$

$$0 \leq k, l \leq N - 1$$

where $$\alpha(k), \beta(k) = \begin{cases} 1, & \text{if } k = 0 \\ \sqrt{2}, & \text{if } k \neq 0, \end{cases}$$

and x(m,n) is the pixel location (m,n) within an N×M block, and

X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property makes the DCT technique such an attractive compression method.

It has been observed that most natural images are made up of flat relatively slow varying areas, and busy areas such as object boundaries and high-contrast texture. Contrast adaptive coding schemes take advantage of this factor by assigning more bits to the busy areas and less bits to the less busy areas. This technique is disclosed in U.S. Pat. No. 5,021,891, entitled "Adaptive Block Size Image Compression Method and System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilizes what is referred to as "intra-frame" encoding, where each frame of image data is encoded without regard to the content of any other frame. Using the ABSDCT technique, the achievable data rate may be greatly without discernible degradation of the image quality.

Using ABSDCT, a video signal will generally be segmented into blocks of pixels for processing. For each block, the luminance and chrominance components are passed to a block interleaver. For example, a 16×16 (pixel) block may be presented to the block interleaver, which orders or organizes the image samples within each 16×16 block to produce blocks and composite sub-blocks of data for discrete cosine transform (DCT) analysis. The DCT operator is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

For image processing purposes, the DCT operation is performed on pixel data that is divided into an array of non-overlapping blocks. Note that although block sizes are discussed herein as being N×N in size, it is envisioned that various block sizes may be used. For example, an N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g. 9×9.

In general, an image is divided into blocks of pixels for processing. A color signal may be converted from RGB space to $YC_1C_2$ space, with Y being the luminance, or brightness, component, and $C_1$ and $C_2$ being the chrominance, or color, components. Because of the low spatial sensitivity of the eye to color, many systems sub-sample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering "digital cinema." Two possible $YC_1C_2$ representations are, the YIQ representation and the YUV representation, both of which are well known in the art. It is also possible to employ a variation of the YUV representation known as YCbCr.

Referring now to FIG. 1, an image processing system 100 which incorporates the invention is shown. The image processing system 100 comprises an encoder 102 that compresses a received video signal. The compressed signal is transmitted through a transmission channel 104, and received by a decoder 106. The decoder 106 decodes the received signal into image samples, which may then be displayed.

In a preferred embodiment, each of the Y, Cb, and Cr components is processed without sub-sampling. Thus, an input of a 16×16 block of pixels is provided to the encoder 102. The encoder 102 comprises a block size assignment element 108, which performs block size assignment in preparation for video compression. The block size assignment element 108 determines the block decomposition of the 16×16 block based on the perceptual characteristics of the image in the block. Block size assignment subdivides each 16×16 block into smaller blocks in a quad-tree fashion depending on the activity within a 16×16 block. The block size assignment element 108 generates a quad-tree data, called the PQR data, whose length can be between 1 and 21 bits. Thus, if block size assignment determines that a 16×16 block is to be divided, the R bit of the PQR data is set and is followed by four additional bits of Q data corresponding to the four divided 8×8 blocks. If block size assignment determines that any of the 8×8 blocks is to be subdivided, then four additional bits of P data for each 8×8 block subdivided are added.

Figure 2:
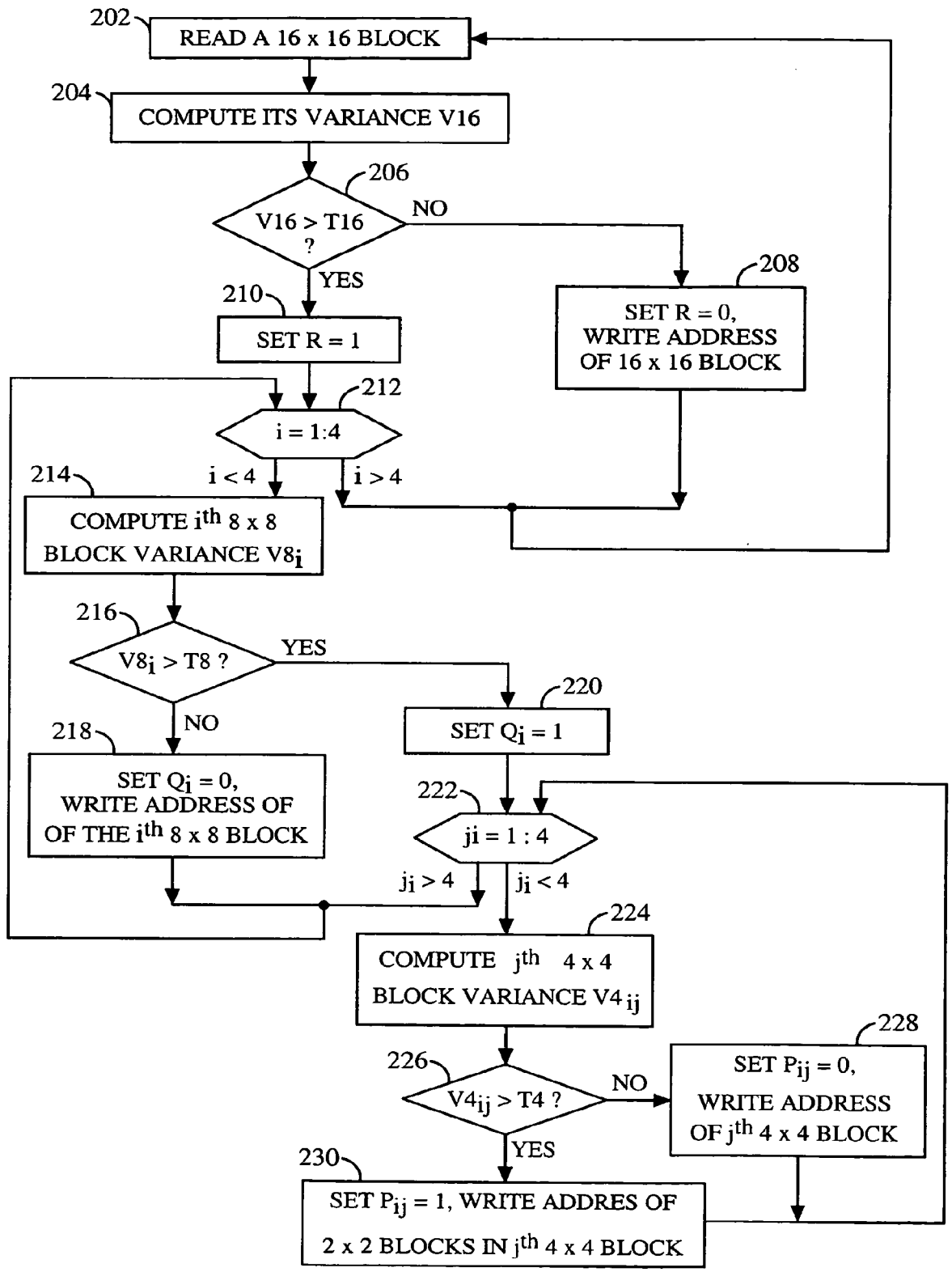
FIG. 2 is a block diagram illustrating details of a block size assignment.

Referring now to FIG. 2, a flow diagram showing details of the operation of the block size assignment element 108 is provided. The algorithm uses the variance of a block as a metric in the decision to subdivide a block. Beginning at step 202, a 16×16 block of pixels is read. At step 204, the variance, v16, of the 16×16 block is computed. The variance is computed as follows:

$$\mathrm{var} = \frac{1}{N^2} \sum_{i=0}^{N-1} \sum_{j=0}^{N-1} x_{i,j}^2 - \left( \frac{1}{N^2} \sum_{i=0}^{N-1} \sum_{j=0}^{N-1} x_{i,j} \right)^2$$

where N=16, and $x_{i,j}$ is the pixel in the $i^{th}$ row, $j^{th}$ column within the N×N block. At step 206, first the variance threshold T16 is modified to provide a new threshold T' 16 if the mean value of the block is between two predetermined values, then the block variance is compared against the new threshold, T' 16.

If the variance v16 is not greater than the threshold T16, then at step 208, the starting address of the 16×16 block is written, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, $v8_i$, is computed, at step 214. At step 216, first the variance threshold T8 is modified to provide a new threshold T'8 if the mean value of the block is between two predetermined values, then the block variance is compared to this new threshold.

If the variance $v8_i$ is not greater than the threshold T8, then at step 218, the starting address of the 8×8 block is written, and the corresponding Q bit, $Q_i$, is set to 0. The next 8×8 block is then processed. If the variance $v8_i$ is greater than the threshold T8, then at step 220, the corresponding Q bit, $Q_i$, is set to 1 to indicate that the 8×8 block is to be subdivided into four 4×4 blocks.

The four 4×4 blocks, $j_i$=1:4, are considered sequentially for further subdivision, as shown in step 222. For each 4×4 block, the variance, $v4_{ij}$, is computed, at step 224. At step 226, first the variance threshold T4 is modified to provide a new threshold T'4 if the mean value of the block is between two predetermined values, then the block variance is compared to this new threshold.

If the variance $v4_{ij}$ is not greater than the threshold T4, then at step 228, the address of the 4×4 block is written, and the corresponding P bit, $P_{ij}$, is set to 0. The next 4×4 block is then processed. If the variance $v4_{ij}$ is greater than the threshold T4, then at step 230, the corresponding P bit, $P_{ij}$, is set to 1 to indicate that the 4×4 block is to be subdivided into four 2×2 blocks. In addition, the address of the 4 2×2 blocks are written.

The thresholds T16, T8, and T4 may be predetermined constants. This is known as the hard decision. Alternatively, an adaptive or soft decision may be implemented. The soft decision varies the thresholds for the variances depending on the mean pixel value of the 2N×2N blocks, where N can be 8, 4, or 2. Thus, functions of the mean pixel values, may be used as the thresholds.

For purposes of illustration, consider the following example. Let the predetermined variance thresholds for the Y component be 50, 1100, and 880 for the 16×16, 8×8, and 4×4 blocks, respectively. In other words, T16=50, T8=1100, and T16=880. Let the range of mean values be 80 and 100. Suppose the computed variance for the 16×16 block is 60. Since 60 and its mean value 90 is greater than T16, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with the first four corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block.

Note that a similar procedure is used to assign block sizes for the color components $C_1$ and $C_2$. The color components may be decimated horizontally, vertically, or both. Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

Referring back to FIG. 1, the remainder of the image processing system 100 is described. Certain blocks may selectively be decimated by a decimator element 109. A common method for reducing a number of bits needed for compression of a digital image is to reduce the special resolution of frames. However, this may cause noticeable image distortion. However, by using adaptive block sizes, chrominance resolution may be used to decimate the image only in areas of low chrominance information and not in areas of high chrominance information.

The decision to decimate may depend upon a variety of factors and considerations. Factors include, but are not limited to, the level of detail within the block and within each color component, the chrominance resolution, the contrast, the desired bit rate, the desired image quality level, and/or the block size. The decimator 109, and the decimation process, is described in greater detail in the description with respect to FIGS. 3 and 4*a*, 4*b*, and 4*c*.

The PQR data, along with the addresses of the selected blocks, are provided to a DCT element 110. The DCT element 110 uses the PQR data to perform discrete cosine transforms of the appropriate sizes on the selected blocks. Only the selected blocks need to undergo DCT processing.

The image processing system 100 may optionally comprise DQT element 112 for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients.

The DQT element 112 performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients with an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

The transform coefficients (both DCT and DQT) are provided to a quantizer 114 for quantization. In a preferred embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual system is more sensitive to, and to de-emphasize samples having frequency content that the visual system is less sensitive to. The weights may also be designed based on factors such as viewing distances, etc.

Huffman codes are designed from either the measured or theoretical statistics of an image. It has been observed that most natural images are made up of blank or relatively slowly varying areas, and busy areas such as object boundaries and high-contrast texture. Huffman coders with frequency-domain transforms such as the DCT exploit these features by assigning more bits to the busy areas and fewer bits to the blank areas. In general, Huffman coders make use of look-up tables to code the run-length and the non-zero values.

In an embodiment, the weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is herein incorporated by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8 * DCT(i, j)}{fwm(i, j) * q} \pm \frac{1}{2} \right\rfloor$$

where DCT(i,j) is the input DCT coefficient, fwm(i,j) is the frequency weighting mask, q is the scale factor, and DCTq(i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr components.

The quantized coefficients are provided to a zigzag scan serializer 116. The serializer 116 scans the blocks of quantized coefficients in a zigzag fashion to produce a serialized stream of quantized coefficients. A number of different zigzag scanning patterns, as well as patterns other than zigzag may also be chosen. A preferred technique employs 8×8 block sizes for the zigzag scanning, although other sizes may be employed.

Note that the zigzag scan serializer 116 may be placed either before or after the quantizer 114. The net results are the same.

In any case, the stream of quantized coefficients is provided to a variable length coder 118. The variable length coder 118 may make use of run-length encoding of zeros followed by encoding. This technique is discussed in detail in aforementioned U.S. Pat. Nos. 5,021,891, 5,107,345, and 5,452,104, and is summarized herein. A run-length coder takes the quantized coefficients and notes the run of successive coefficients from the non-successive coefficients. The successive values are referred to as run-length values, and are encoded. The non-successive values are separately encoded. In an embodiment, the successive coefficients are zero values, and the non-successive coefficients are non-zero values. Typically, the run length is from 0 to 63 bits, and the size is an AC value from 1-10. An end of file code adds an additional code—thus, there is a total of 641 possible codes.

Figure 3:
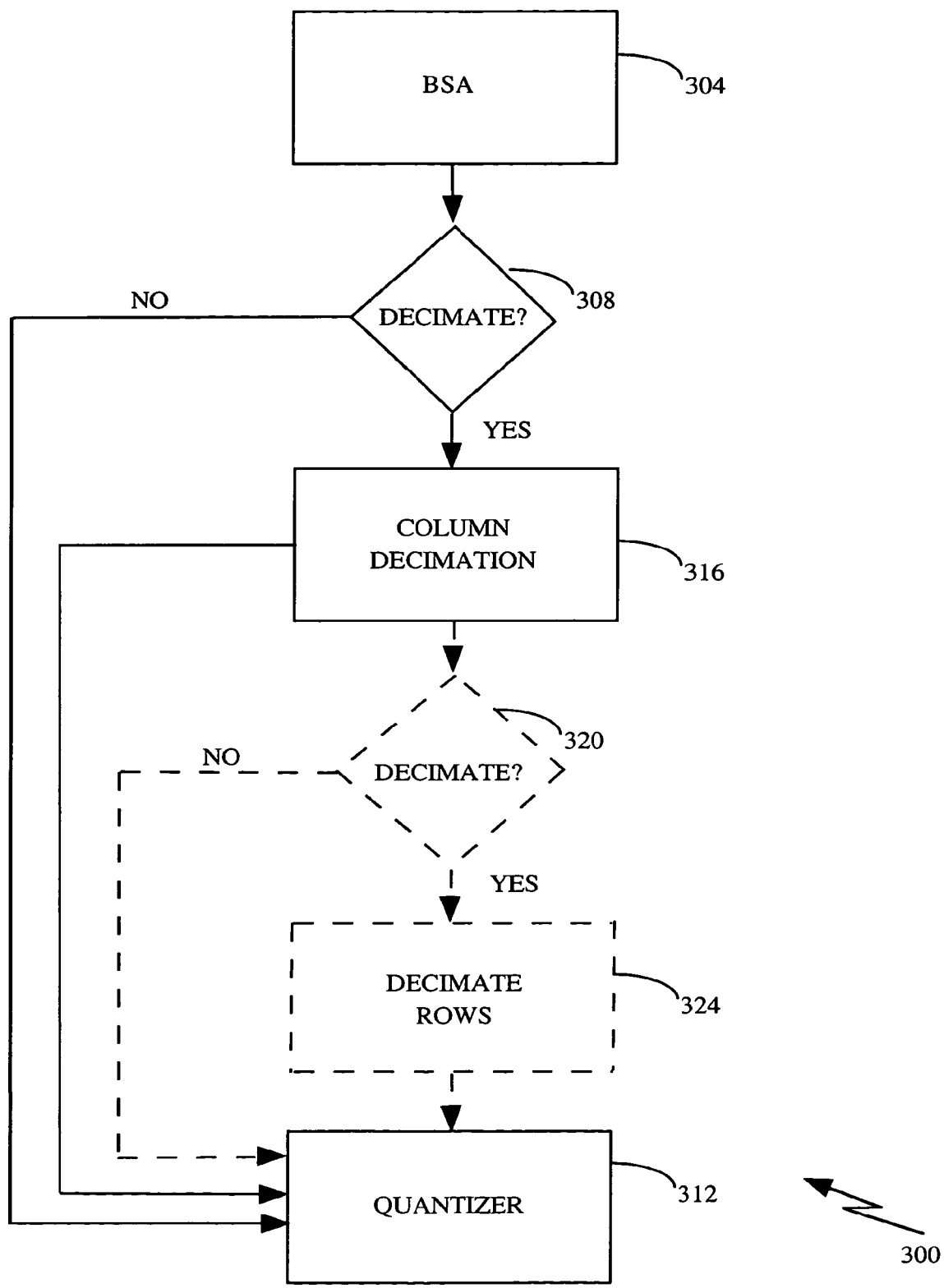
FIG. 3 is a flow diagram illustrating the selective decimation process of a 4:4:4 digital image.

FIG. 3 illustrates a flow diagram of selective decimation of a digital image 300. After the block size assignment element 304 is performed (as described with respect to FIG. 1), a decision 308 is made whether to decimate the block. In an embodiment, the decision to decimate is done on pixel blocks, after the block size assignment. However, the decision to decimate may alternatively occur in the frequency domain, after the blocks have undergone the DCT/DQT process.

Referring back to FIG. 3, if the block has low chrominance information in a given block, or corresponding frequency representation of the pixel area, decimation is appropriate. If the block has high chrominance information, the decision not to decimate is made and the data is passed to quantizer 312. Chrominance is not necessarily, however, the only or over-riding factor as to whether to decimate. The decision to decimate may be based on a variety of factors, such as the desired bit rate, visual quality factors, or other rate-based factors, such as the block size or chroma component itself. For example, one could choose to decimate a single chroma component $C_b$ or $C_r$ as opposed to both chroma components. It has been found that in some instances, a single chroma component may be decimated without compromising visual quality. In an embodiment, the decision to decimate is configurable based upon the user's needs. In yet another embodiment, the decision to decimate is dynamically configurable based upon user's needs.

Upon the decision to decimate, column decimation 316 is commenced, thus converting the 4:4:4 image into a 4:2:2 image. Optionally, another decision 320 of whether to decimate is again made if it is desired to decimate to a 4:2:0 format. If so, row decimation 324 commences. If not, the data is passed to quantizer 312.

In an embodiment, areas of high chrominance information, that is, those with smaller block size assignments, are not chosen for decimation. However, areas with low chrominance information, that is large block size assignments, are appropriate for decimation. In another embodiment, block size assignment is a determining factor for decimation. If the block size is 16×16, the block is decimated. If the block size is less than 16×16, such as 8×8, 4×4, or 2×2, the block is not decimated so that detail is preserved. In another embodiment, 16×16 and 8×8 blocks are decimated, while 4×4 and 2×2 blocks are not decimated. The precise decision process may depend on a number of parameters.

Selectively decimating blocks in areas of the image with low amounts of chrominous resolution reduces the bit rates in those areas while maintaining chrominous quality. Concurrently, by not decimating chrominous resolution in areas of high chrominance resolution, good image quality in those areas is maintained.

FIG. 4a illustrates an example of a 4:4:4 block of pixel data 400. Values are given for each for each color luminance and chrominance component Y, $C_b$ and $C_r$ for each pixel. Typically, decimation is only considered to be performed on the chrominance components $C_b$ and $C_r$, and not the luminance component Y. It is not always desirable to decimate the luminance component Y, because decimation of the luminance component Y may be humanly perceptible. To decimate a block of chrominance pixel data from 4:4:4 format to 4:2:2 format, filtering of each chrominance component $C_b$ and $C_r$ is performed. In an embodiment, the filtering process involves weighting column values by using a gaussian filter for a particular element with adjacent elements. Column filtering is preferred in that it has been found that more correlation exists in horizontal directions, as opposed to vertical directions. In an embodiment, an element (n−1,m) in a 4:2:2 format is derived by taking the sum of 25% of the (n−1, m−1) element, 50% of the (n−1, m) element, and 25% of the (n−1, m+1) element. Accordingly, in 4:2:2 format, the new value of (n−1,m) is as follows:

$$(n-1,m)=(0.25*20)+(0.50*32)+(0.25*28)=28$$

Similar calculations are made for every other column of elements, resulting in a table of elements in 4:2:2 format as illustrated in FIG. 4b. Accordingly, every other column of data has been removed, but their values are represented in the remaining columns using the above described weighted relationship. It is contemplated that other weighting schemes may be employed, such as a three-point filter with equal weighting, such that each element is multiplied by 0.33.

FIG. 4c illustrates an example of a 4:2:0 format of pixel data. To compute 4:2:0 data, row decimation is performed using the same weighting scheme of 0.25 for each adjacent element, and 0.50 for the given element. Accordingly, an element (n, m) in a 4:2:0 format is derived by taking the sum of 25% of the (n−1, m) element, 50% of the (n, m) element, and 25% of the (n+1, m) element. Accordingly, in 4:2:0 format, the new value of (n,m) is as follows:

$$(n,m)=(0.25*28)+(0.50*21.5)+(0.25*21.5)=23.125.$$

Depending upon the resolution, the value of (n,m) may be rounded in either the frequency or pixel domain. As examples, the various illustrative logical blocks, flow charts, and steps described in connection with the embodiments disclosed herein may be implemented or performed in hardware or software with an application-specific integrative circuit (ASIC), a programmable logic device, a microprocessor, discrete gate or transistor logic, discrete hardware components, such as, e.g., registers and a FIFO, a processor executing a set of firm-ware instructions, and a convential programmable software and a processor, or any combination thereof. The processor may advantageously be a microprocessor, but in the alternative, the processor may be any conventional processor, controller, microcontroller, or state machine. The software may reside in RAM memory, flash memory, ROM memory, registers, hard disk, a removable disk, a CD-ROM, a DVD-ROM or any other form of storage medium known in the art.

The previous description of the preferred embodiment is provided to enable any person skilled in the art to make or use the present invention. The various modifications to these embodiments will be readily apparent to those skilled in the art, and the generic principles to find herein may be applied to other embodiments without the use of inventive faculty. Thus, the present invention is not intended to be limited to the embodiments shown herein but is to be accorded to the widest scope consistent with the principles and novel features disclosed herein.

The invention claimed is:

1. A method of decimation of a digital image performed on a processor, the digital image represented by a plurality of pixels, the method comprising:
   dividing on the processor a block indicating the digital image into a plurality of blocks;
   decimating on the processor, selectively, chrominance resolution of certain ones of the blocks based upon a function of the chrominace information of the block.

2. The method as set forth in claim 1, wherein the decimating step is also based on a function of the contrast of the block.

3. The method as set forth in claim 1, wherein the decimating step is also based on a function of the level of detail within the block.

4. The method as set forth in claim 1, wherein the decimating step is also based on a function of the desired bit rate.

5. The method as set forth in claim 1, wherein the decimating step is also based on the block size.

6. The method as set forth in claim 1, wherein dividing further comprises utilizing adaptive block size discrete cosine transforms (ABSDCT).

7. The method as set forth in claim 1, wherein dividing further comprises separating the digital image into Y, Cb and Cr components.

8. An apparatus for decimation of a digital image, the digital image represented by a plurality of pixels, the apparatus comprising:
   means for dividing a block indicating the digital image into a plurality of blocks;
   means for selectively decimating chrominance resolution of certain ones of the blocks based upon a function of the chrominace information of the block.

9. The apparatus as set forth in claim 8, wherein the decimating means also decimates based on a function of the contrast of the block.

10. The apparatus as set forth in claim 8, wherein the decimating means also decimates based on a function of the level of detail within the block.

11. The apparatus as set forth in claim 8, wherein the decimating means also decimates based on a function of the desired bit rate.

12. The apparatus as set forth in claim 8, wherein the decimating means also decimates based on the block size.

13. The apparatus as set forth in claim 8, wherein means for dividing further comprises means for utilizing adaptive block size discrete cosine transform (ABSDCT) technique.

14. The apparatus as set forth in claim 8, wherein means for dividing further comprises means for separating the digital image into Y, Cb and Cr components.

15. An apparatus for decimation of a digital image, the digital image represented by a plurality of pixels, the apparatus comprising:
   a divider configured to divide a block indicating the digital image into a plurality of blocks;
   a decimator configured to selectively decimate chrominance resolution of certain ones of the blocks based upon a function of the chrominance information of the block.

16. The apparatus as set forth in claim 15, wherein the decimator is further configured to decimate chrominance resolution of certain ones of the blocks based on a function of the contrast of the block.

17. The apparatus as set forth in claim 15, wherein the decimator is further configured to decimate chrominance resolution of certain ones of the blocks based on a function of the level of detail within the block.

18. The apparatus as set forth in claim 15, wherein the decimator is further configured to decimate chrominance resolution of certain ones of the blocks based on a function of the desired bit rate.

19. The apparatus as set forth in claim 15, wherein the decimator is further configured to decimate chrominance resolution of certain ones of the blocks based on the block size.

20. The apparatus as set forth in claim 15, wherein the divider is further configured to utilize adaptive block size discrete cosine transforms (ABSDCT).

21. The apparatus as set forth in claim 15, wherein the divider further comprises a separator, the separator configured to separate the digital image into Y, Cb and Cr components.

22. A non-transitory computer-readable medium encoded with a computer program of instructions for causing a computer to decimate a digital image, the digital image represented by a plurality of pixels, the computer-readable medium comprising:
   instructions for causing a computer to divide a block indicating the digital image into a plurality of blocks; and
   instructions for causing a computer to decimate, selectively, chrominance resolution of certain ones of the blocks based upon a function of the chrominace information of the block.

23. The computer-readable medium as set forth in claim 22, wherein the instructions for causing a computer to decimate chrominance resolution of certain ones of the blocks comprise instructions for causing a computer to decimate chrominance resolution of certain ones of the blocks also based on a function of the contrast of the block.

24. The computer-readable medium as set forth in claim 22, wherein the instructions for causing a computer to decimate chrominance resolution of certain ones of the blocks comprise instructions for causing a computer to decimate chrominance resolution of certain ones of the blocks also based on a function of the level of detail within the block.

25. The computer-readable medium as set forth in claim 22, wherein the instructions for causing a computer to decimate chrominance resolution of certain ones of the blocks comprise instructions for causing a computer to decimate chrominance resolution of certain ones of the blocks also based on a function of the desired bit rate.

26. The computer-readable medium as set forth in claim 22, wherein the instructions for causing a computer to decimate chrominance resolution of certain ones of the blocks comprise instructions for causing a computer to decimate chrominance resolution of certain ones of the blocks also based on the block size.

27. The computer-readable medium as set forth in claim 22, wherein the instructions for causing a computer to divide further comprise instructions for causing a computer to utilize adaptive block size discrete cosine transforms (ABSDCT).

28. The computer-readable medium as set forth in claim 22, wherein the instructions for causing a computer to divide further comprise instructions for causing a computer to separate the digital image into Y, Cb and Cr components.

29. The method of claim 1, wherein decimating on the processor, selectively, chrominance resolution of certain blocks comprises reducing a number of bits used to communicate chrominance values of pixels in the certain blocks.

30. The apparatus of claim 8, wherein the means for selectively decimating chrominance resolution of certain ones of the blocks comprises means for reducing a number of bits used to communicate chrominance values of pixels in the certain blocks.

31. The apparatus of claim 15, wherein the decimator is configured such that selectively decimating chrominance resolution of certain ones of the blocks reduces a number of bits used to communicate chrominance values of pixels in the certain blocks.

32. The non-transitory computer-readable medium of claim 22, wherein the instructions for causing a computer to decimate, selectively, chrominance resolution of certain ones of the blocks comprises instructions for causing a computer to reduce a number of bits used to communicate chrominance values of pixels in the certain blocks.

* * * * *